(12) United States Patent
Im et al.

(10) Patent No.: US 10,483,819 B2
(45) Date of Patent: Nov. 19, 2019

(54) STATOR ASSEMBLY FOR MOTOR

(71) Applicant: Hanon Systems, Daejeon (KR)

(72) Inventors: Ho Bin Im, Chungcheongnam-do (KR); Eun Seok Kang, Daejeon (KR); Sang Hun Kim, Daejeon (KR); Tae Wan Kim, Daejeon (KR); Hee Kwon Park, Daejeon (KR); Seong Kook Cho, Daejeon (KR); Kyung Hun Jung, Daejeon (KR)

(73) Assignee: Hanon Systems, Daejeon (KR)

( * ) Notice: Subject to any disclaimer, the term of this patent is extended or adjusted under 35 U.S.C. 154(b) by 172 days.

(21) Appl. No.: 15/524,155

(22) PCT Filed: Feb. 22, 2016

(86) PCT No.: PCT/KR2016/001708
§ 371 (c)(1),
(2) Date: May 3, 2017

(87) PCT Pub. No.: WO2016/137177
PCT Pub. Date: Sep. 1, 2016

(65) Prior Publication Data
US 2017/0353070 A1 Dec. 7, 2017

(30) Foreign Application Priority Data
Feb. 26, 2015 (KR) .................. 10-2015-0027384

(51) Int. Cl.
*H02K 3/28* (2006.01)
*H02K 3/34* (2006.01)
*H02K 3/52* (2006.01)

(52) U.S. Cl.
CPC .............. *H02K 3/28* (2013.01); *H02K 3/345* (2013.01); *H02K 3/522* (2013.01); *H02K 2203/09* (2013.01)

(58) Field of Classification Search
CPC ..... H02K 3/522; H02K 5/225; H02K 2203/09
See application file for complete search history.

(56) References Cited

U.S. PATENT DOCUMENTS 5,508,571 A * 4/1996 Shafer, Jr. ................ H02K 3/28
310/179
6,924,570 B2 * 8/2005 De Filippis ............ H02K 3/522
310/260

(Continued)

FOREIGN PATENT DOCUMENTS

JP 2005287240 A 10/2005
JP 2007202263 A 8/2007

(Continued)

OTHER PUBLICATIONS

International Search Report issued in PCT/KR2016/001708 dated Jun. 21, 2016.

*Primary Examiner* — Dang D Le
(74) *Attorney, Agent, or Firm* — Norton Rose Fulbright US LLP

(57) ABSTRACT

Disclosed herein is a stator assembly for a motor. The stator assembly comprises a stator core having a plurality of teeth around each of which a stator coil is wound, a first insulator coupled to one side of the stator core to provide insulation between one tooth and an adjacent tooth, a second insulator coupled to the other side of the stator core to provide insulation between one tooth and an adjacent tooth, and a three-phase terminal inserted between the stator core and the second insulator and protruded partially to the outside of the second insulator to be electrically connected to an inverter. According to the present invention, there are advantageous effects that since the three-phase terminal is assembled between insulators, breakaway and breakage of the three- (Continued)

phase terminal can be prevented and that insulation effect and assembly capability thereof are enhanced.

15 Claims, 3 Drawing Sheets

(56) References Cited

U.S. PATENT DOCUMENTS 7,476,995 B2 * 1/2009 Uchiyama .............. H02K 3/505
310/179
7,834,497 B2 * 11/2010 Utsunomiya ......... F02N 15/067
290/38 R

FOREIGN PATENT DOCUMENTS

| JP | 2008118792 A | 5/2008 |
| JP | 2013162648 A | 8/2013 |
| KR | 20110104648 A | 9/2011 |

* cited by examiner

STATOR ASSEMBLY FOR MOTOR

CROSS-REFERENCE(S) TO RELATED APPLICATIONS

This application is a § 371 of International Application No. PCT/KR2016/001708 filed on Feb. 22, 2016, and claims priority to from Korean Patent Application No. 10-2015-0027384, filed on Feb. 26, 2015.

BACKGROUND OF THE INVENTION

Field of the Invention

Exemplary embodiments of the present invention relate to a stator assembly for a motor, and more particularly, to a stator assembly for a motor having improved structure and coupling structure of a terminal.

Description of the Related Art

A motor is a device that converts electrical energy to mechanical work by using forces which is received by electric current in the magnetic field, and utilized in various industries such as washing machines, refrigerators and electric cars.

In general, the motor comprises a stator and a rotor wherein the stator comprises a plurality of teeth and a stator core having a plurality of slots formed between the teeth and a coil is wound inside the slot. The efficiency of the motor varies depending on the number of turns of coil even if the motor has a stator of the same size.

On the other hand, separate insulators are coupled to the top and bottom of the stator core along a lamination direction of the stator core to provide insulation between each tooth and the stator core and other components.

An example of the motor having such insulation structure is disclosed in Korea Patent Laid-Open Publication No. 2006-0027704.

However, since the conventional motor has the structure that the terminal is coupled onto the insulator arranged on the top of the stator core in a lamination direction of the stator core, the terminal is often broken away from the stator core by impact applied from the outside after assembly. In addition, since the terminal is coupled to the outside of the insulator, a separate space for seating the terminal is required and hence a spacing gap is required in assembling with a housing. As a result, this causes an axial length of the motor to increase. Furthermore, since many parts of the terminal are exposed to the outside, there is strong possibility that the terminal is damaged due to external impact.

PRIOR ART DOCUMENTS

[Patent Document] Korean Patent Laid-Open Publication No. 2006-0027704 (published on Mar. 28, 2006)

SUMMARY OF THE INVENTION

An object of the present invention is to provide a stator assembly for a motor having an improved structure and coupling structure of a terminal.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, a stator assembly for a motor comprises a stator core 100 having a plurality of teeth 130 around each of which a stator coil 150 is wound, a first insulator 200 coupled to one side of the stator core 100 to provide insulation between one tooth 130 and an adjacent tooth 130, a second insulator 300 coupled to the other side of the stator core 100 to provide insulation between one tooth 130 and an adjacent tooth 130, and a three-phase terminal 500 inserted between the stator core 100 and the second insulator 300 and protruded partially to the outside of the second insulator 300 to be electrically connected to an inverter.

It is characterized in that the three-phase terminal 500 has a form that one ring shape is divided into a plurality of parts.

The three-phase terminal 500 may comprise streamlined terminal bodies 510, inverter connecting portions 530 protruded to one side of the terminal bodies 510 and inserted into an inverter housing, and a plurality of coil engaging portions 550 formed to be spaced from the inverter connecting portions 530.

It is characterized in that the inverter connecting portions 530 are formed to protrude in a bar shape from one longitudinal side of the terminal bodies 510 toward the second insulator 300.

It is characterized in that the inverter connecting portions 530 are formed in the same direction on the respective terminal bodies 510.

It is characterized in that the plurality of inverter connecting portions 530 are arranged at equal intervals from each other.

The coil engaging portion 550 may comprise a welding portion 552 spaced apart from the terminal body 510 and protruded in a direction of an arc of the terminal body 510, and a coil junction portion 554 formed to be concave between the welding portion 552 and the terminal body 510 to allow a coil of the inverter to be inserted therein.

It is characterized in that the coil junction portion 554 corresponds to diameter of the coil of the inverter.

It is characterized in that the welding portion 552 is welded to the inverter housing.

It is characterized in that width of a space between the welding portion 552 and the terminal body 510 is formed to be smaller than the diameter of the coil.

The three-phase terminal may further comprise a plurality of recess portions 570 formed to be concave between the inverter connecting portion 530 and the coil junction portion 550.

The stator assembly may further comprise a third insulator 400 inserted between the three-phase terminal 500 and the stator core 100 to provide insulation between the three-phase terminal 500 and the stator core 100.

It is characterized in that the third insulator 400 has a ring shape and width greater than thickness of the three-phase terminal 500.

The third insulator 400 may comprise a plurality of locking hooks 410 to be caught and retained in the recess portions 570 of the terminal body 510 respectively.

The second insulator 300 may comprise a plurality of terminal inserting portions 330 to which the three-phase terminal 500 is inserted.

The second insulator 300 may further comprise a inserting portion 350 formed to protrude from the terminal inserting portion 330 to cover a portion of the inverter connecting portion 530.

The first insulator 200 and the second insulator 300 may further comprise coil insulation portions 210, 310 inserted between the plurality of teeth 130 respectively to provide insulation between the plurality of teeth 130.

A stator assembly for a motor according to an embodiment of the present invention has advantageous effects that since the three-phase terminal is assembled between insulators, breakaway and breakage of the three-phase terminal can be prevented and insulation effect and assembly capability of the three-phase terminal are enhanced. Furthermore, there is an effect to reduce the axial length of the stator assembly.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

Exemplary embodiments of a stator assembly for a motor according to the present invention will be described below in detail with reference to the accompanying drawings. The present invention may, however, be embodied in different forms and should not be construed as limited to the embodiments set forth herein.

Figure 1:
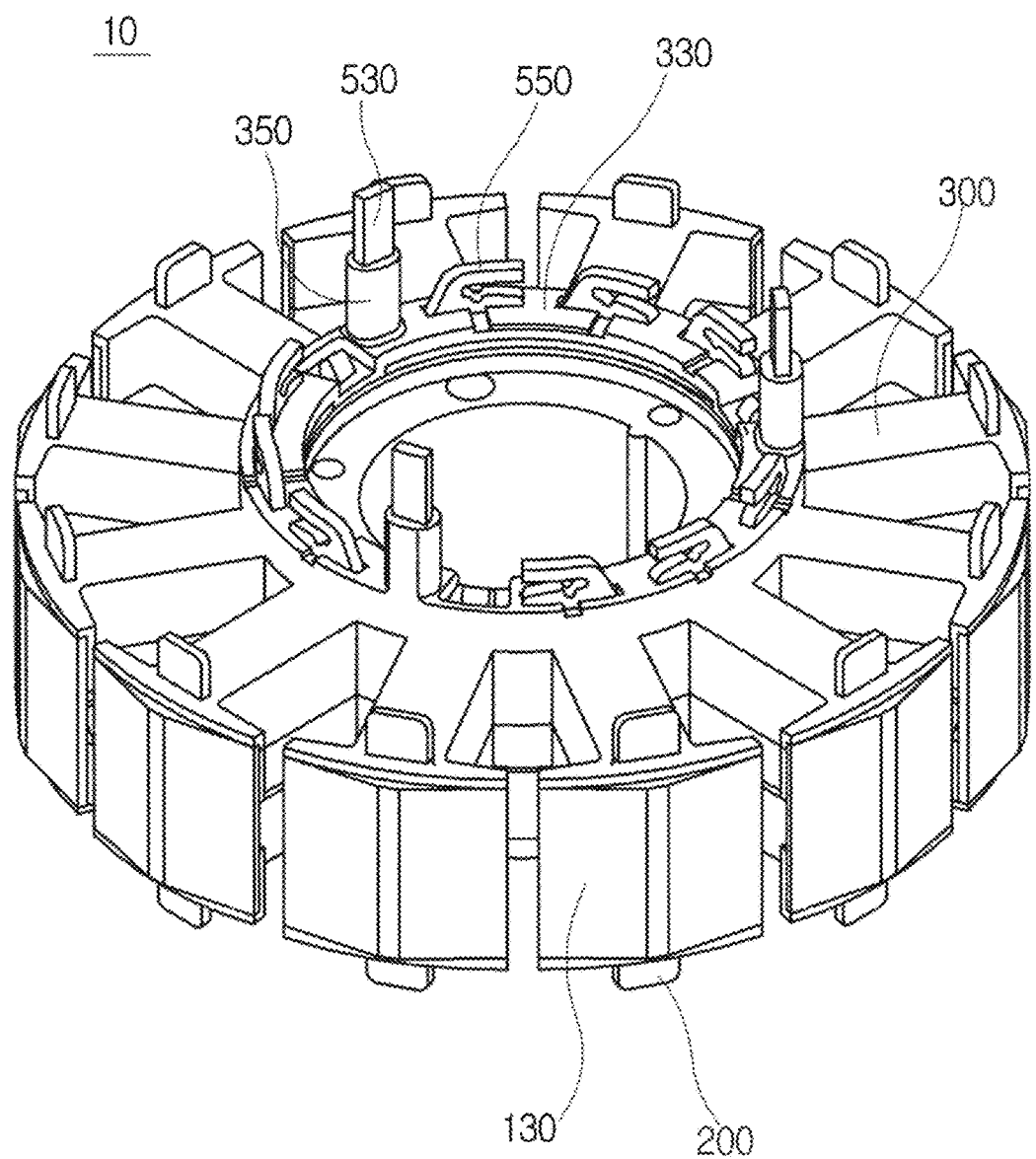
FIG. 1 is a perspective view illustrating a stator assembly for a motor according to an embodiment of the present invention in a condition that the stator assembly is assembled.
Figure 2:
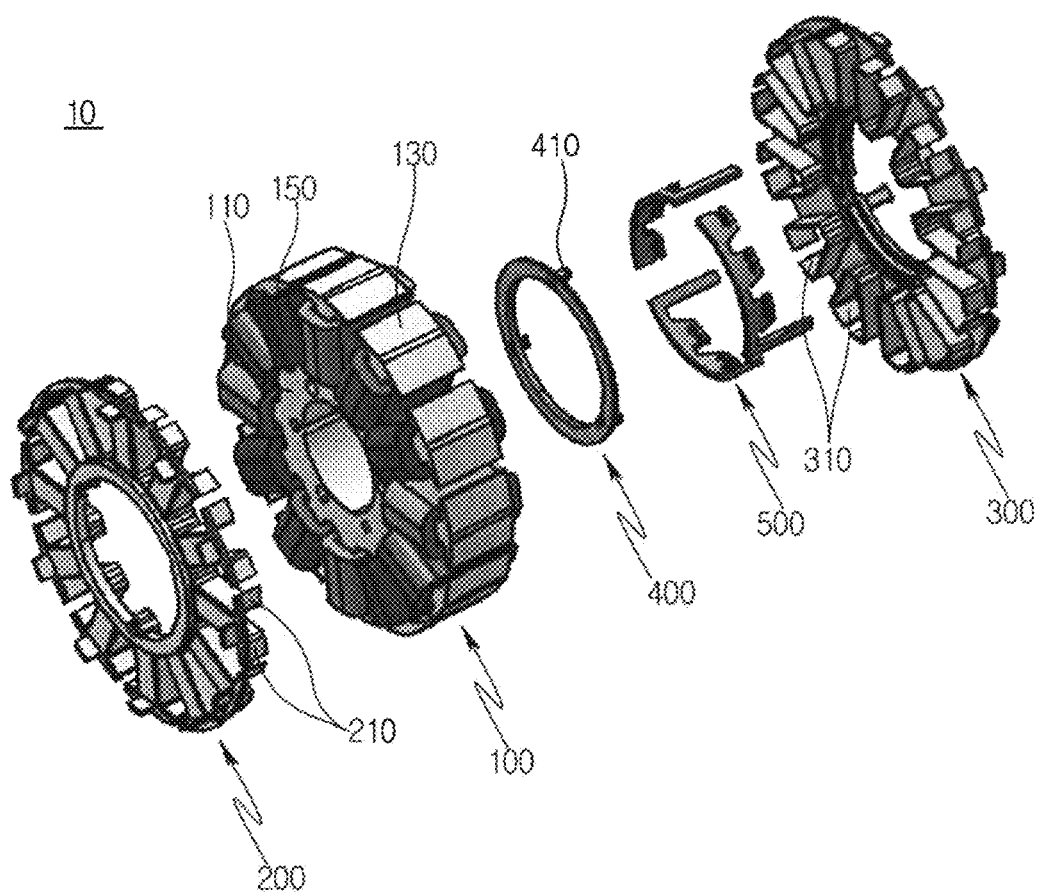
FIG. 2 is an exploded perspective view illustrating a stator assembly for a motor according to an embodiment of the present invention.
Figure 3:
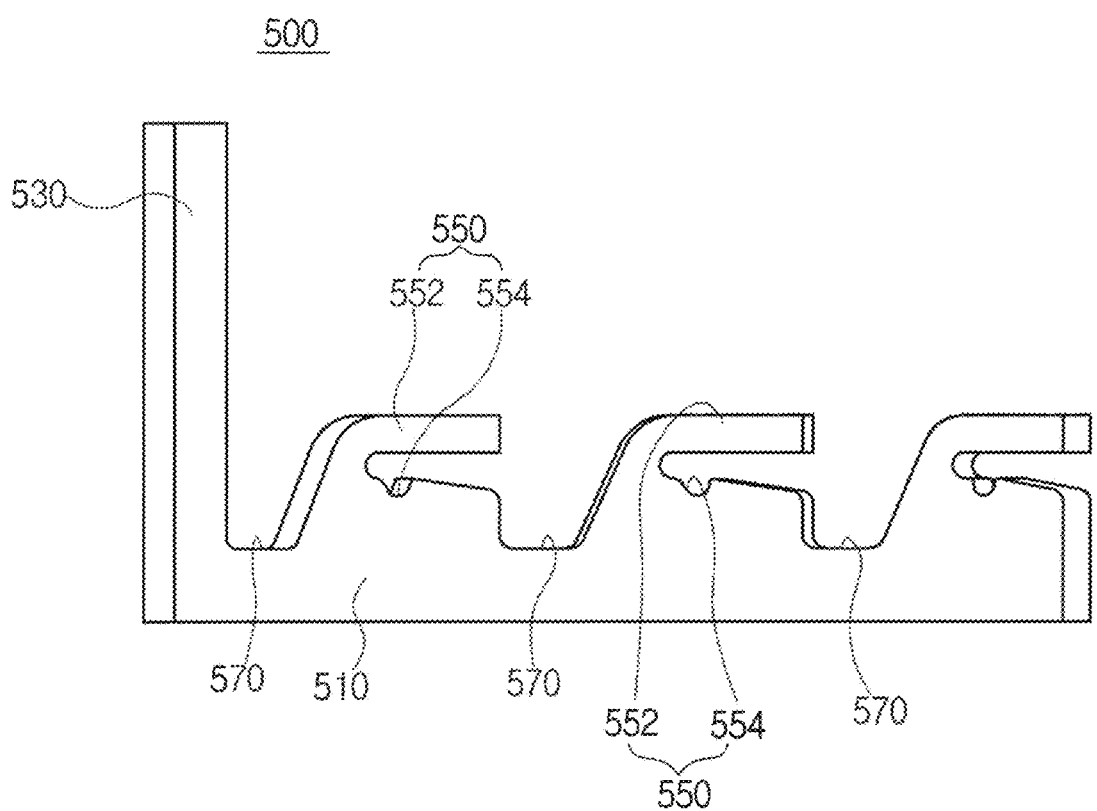
FIG. 3 is a perspective view illustrating a three-phase terminal according to the stator assembly of FIGS. 1 and 2.

FIG. 1 is a perspective view illustrating a stator assembly for a motor according to an embodiment of the present invention in a condition that the stator assembly is assembled; FIG. 2 is an exploded perspective view illustrating a stator assembly for a motor according to an embodiment of the present invention; and FIG. 3 is a perspective view illustrating a three-phase terminal according to the stator assembly of FIGS. 1 and 2.

As shown in FIGS. 1 and 2, a stator assembly 10 for a motor according to an embodiment of the present invention comprises a stator core 100, a first insulator 200 coupled to one side of the stator core 100, a second insulator 300 coupled to the other side of the stator core 100, a three-phase terminal 500 inserted between the stator core 100 and the second insulator 300, and a third insulator 400 inserted between the three-phase terminal 500 and the stator core 100.

The stator core 100 comprises yokes 110 having a ring shape, and a plurality of teeth 130 protruded outward along a radial direction of the yokes and disposed along outer peripheral surfaces of the yokes 110.

The tooth 130 is formed in a T shape and has a form that one end having an I-shape is connected to the yoke 110 and the other end protruded forms an extended surface. The teeth 130 are arranged such that one tooth is spaced apart from an adjacent tooth 130 wherein a stator coil 150 is wound around each of the teeth 130.

The first insulator 200 is coupled to one side of the stator core 100 in such a direction that it covers the stator coil 150 exposed to one side of the stator core 100. The first insulator 200 has a plurality of coil insulation portions 210 inserted respectively between the teeth 130 around which the stator coils 150 are wound respectively to provide electrical insulation between adjacent stator coils 150. The coil insulation portions 210 are preferably formed in a manner of protruding on the surfaces facing the stator core 100 of the first insulator 200 respectively.

The second insulator 300 is coupled to the other side of the stator core 100 in such a direction that it covers the stator coil 150 exposed to the other side of the stator core 100. The second insulator 300 has also a plurality of coil insulation portions 310 inserted respectively between the teeth 130 to provide electrical insulation between adjacent stator coils 150. The coil insulation portions 310 of the second insulator 300 are also preferably formed in a manner of protruding on the surfaces facing the stator core 100 respectively.

Furthermore, the second insulator 300 is provided with terminal inserting portions 330 to which the three-phase terminal 500 is inserted. The terminal inserting portions 330 are provided on the inner peripheral surface of the second insulator and formed in the form of a groove corresponding to the shape of the three-phase terminal 500 along a direction that the three-phase terminal 500 is inserted from the stator core 100 side. Surfaces of the terminal inserting portions 330 opposite to the stator core 100 is provided with inserting portions 332 into which the inverter connecting portions 530 of the three-phase terminal 500 are inserted respectively, as described later.

The inserting portions 332 are formed to correspond to the shape of the inverter connecting portions 530, and serve to protect the inverter connecting portions 530 from external impact by covering the other parts except one ends of the inverter connecting portions 530.

The third insulator 400 has a ring shape and prevents one end of the three-phase terminal 500 from being contact directly with the stator core 100. Therefore, the third insulator 400 is preferably formed to have width greater than thickness of the three-phase terminal 500. The third insulator 400 may be provided on its surface facing the three-phase terminal 500 with a plurality of locking hooks 410 for fixing the three-phase terminal 500.

The locking hooks 410 are caught into recess portions 570 formed in a plurality of places of the three-phase terminal 500 as described later and hence fixed to one end of the three-phase terminal 500.

On the other hand, as shown in FIG. 3, the three-phase terminal 500 has a form that one ring-shaped structure is divided into a plurality of parts, wherein each of the three-phase terminal 500 comprises a streamlined terminal body 510, an inverter connecting portion 530 protruding to one side of the terminal body 510, a plurality of coil engaging portions 550 formed to be spaced apart from the inverter connecting portion 530, and a plurality of recess portions 570 formed to be concave between the inverter connecting portion 530 and the plurality of coil engaging portions 550.

The terminal body 510 has a form that a ring-shaped structure having a predetermined width from the third insulator 400 side to the second insulator 300 side is divided into a plurality of parts.

The inverter connecting portions 530 are formed to protrude in a bar shape from one longitudinal side of the terminal bodies 510 toward the second insulator 300 respectively. As all the inverter connecting portions 530 are formed in the plurality of the terminal bodies 510 in the same direction, the plurality of inverter connecting portions 530 can be arranged at equal intervals from each other when assembling the three-phase terminal 500.

The coil engagement portion 550 may comprise welding portions 552 having a bar shape, which are spaced apart at a predetermined distance from the terminal body 510 and protruded in a circumferential direction of the terminal body, and coil junction portions 554 formed to be concave on portions spaced between the welding portion 552 and the terminal body 510.

A portion of a space between the welding portion 552 and the terminal body 510 is recessed to form the coil junction portion 554 such that the coil is inserted stably therein. The coil junction portion 554 formed to be recessed may correspond to diameter of the inverter coil, while width of a space between the welding portion 552 and the terminal body 510 may be formed to be smaller than the diameter of the coil. As the welding portion 552 is of a bar shape, it may be widened slightly outwardly when inserting the inverter coil and then restored back to its original position.

The three-phase terminal 500 is inserted between the second insulator 300 and the third insulator 400 while only a part of the inverter connecting portions 530 and the coil engaging portions 550 are exposed to the outside of the second insulator 300. The inverter connecting portions 530 are inserted into an inverter housing that controls the motor assembly and maintained as having been coupled thereto while the inverter coils are inserted into and connected electrically to coil junction portions 554. At this time, the welding portions 552 are preferably fixed to the inverter housing by means of a fusion welding such that the inverter coils are completely welded.

As described above, one side of the three-phase terminal 500 is supported to be insulated by the third insulator 400 and the other side of the three-phase terminal is coupled to the stator core 100 in the state that it is inserted into the terminal inserting portions 330 of the second insulator 300 and supported to be insulated. Therefore, since a portion of the three-phase terminal 500 exposed to the outside is minimized, there are advantageous effects that insulation performance of the three-phase terminal 500 is enhanced and the three-phase terminal is protected from external impact.

Furthermore, since the three-phase terminal 500 is inserted into the inside of the second insulator 300, a separate coupling structure protruding to the outside can be removed, thereby reducing length in a direction of the center axis of the stator assembly 10.

Embodiments of the present invention described above and illustrated in the drawing should not be construed as limiting the spirit and scope of the present invention. The scope of the present invention is limited only by the appended claims and those of ordinary skill in the art can make various modifications and changes to the present invention without departing from the technical idea of the present invention. Therefore, such modifications and changes will belong to the scope of the invention as far as they are apparent to those of ordinary skill in the art.

What is claimed is:
1. A stator assembly for a motor comprising:
   a stator core having a plurality of teeth around each of which a stator coil is wound;
   a first insulator coupled to one side of the stator core to provide insulation between one tooth and an adjacent tooth;
   a second insulator coupled to the other side of the stator core to provide insulation between one tooth and an adjacent tooth; and
   a three-phase terminal inserted between the stator core and the second insulator and protruded partially to the outside of the second insulator to be electrically connected to an inverter,
   wherein the three-phase terminal has a form that one ring shape is divided into a plurality of parts, and
   wherein each of the plurality of parts of the three-phase terminal comprises a plurality of streamlined terminal bodies, inverter connecting portions protruded to one side of the terminal bodies and inserted into an inverter housing, and a plurality of coil engaging portions formed to be spaced from the inverter connecting portions, and disposed not to overlap each other.

2. The stator assembly according to claim 1, wherein the inverter connecting portions are formed to protrude in a bar shape from one longitudinal side of the terminal bodies toward the second insulator.

3. The stator assembly according to claim 2, wherein the inverter connecting portions are formed in the same direction on the respective terminal bodies.

4. The stator assembly according to claim 3, wherein the plurality of inverter connecting portions are arranged at equal intervals from each other.

5. The stator assembly according to claim 4, wherein the coil engaging portion comprises a welding portion spaced apart from the terminal body and protruded in a direction of an arc of the terminal body, and a coil junction portion formed to be concave between the welding portion and the terminal body to allow a coil of the inverter to be inserted therein.

6. The stator assembly according to claim 5, wherein the coil junction portion corresponds to diameter of the coil of the inverter.

7. The stator assembly according to claim 6, wherein the welding portion is welded to the inverter housing.

8. The stator assembly according to claim 7, wherein width of a space between the welding portion and the terminal body is formed to be smaller than the diameter of the coil.

9. The stator assembly according to claim 1, wherein the three-phase terminal further comprises a plurality of recess portions formed to be concave between the inverter connecting portion and the coil junction portion.

10. The stator assembly according to claim 9 further comprising a third insulator inserted between the three-phase terminal and the stator core to provide insulation between the three-phase terminal and the stator core.

11. The stator assembly according to claim 10, wherein the third insulator has a ring shape and width greater than thickness of the three-phase terminal.

12. The stator assembly according to claim 11, wherein the third insulator comprises a plurality of locking hooks to be caught and retained in the recess portions of the terminal body respectively.

13. The stator assembly according to claim 1, wherein the second insulator comprises a plurality of terminal inserting portions to which the three-phase terminal is inserted.

14. The stator assembly according to claim 13, wherein the second insulator further comprises a inserting portion formed to protrude from the terminal inserting portion to cover a portion of the inverter connecting portion.

15. The stator assembly according to claim 1, wherein the first insulator and the second insulator further comprise coil insulation portions inserted between the plurality of teeth respectively to provide insulation between the plurality of teeth.

\* \* \* \* \*